United States Patent [19]

Göransson et al.

[11] Patent Number: 4,472,006

[45] Date of Patent: Sep. 18, 1984

[54] ROLLER BEARING WITH AN IMPROVED CAGE

[75] Inventors: Bo Göransson, Bilthoven, Netherlands; Anders Sahlgren, Mölndal; Rolf Gustafsson, Hindås, both of Sweden

[73] Assignee: Aktiebolaget SKF, Goteborg, Sweden

[21] Appl. No.: 498,772

[22] Filed: Jun. 13, 1983

[30] Foreign Application Priority Data

Jun. 9, 1982 [SE] Sweden ............................... 8203576

[51] Int. Cl.³ .............................................. F16C 33/46
[52] U.S. Cl. ...................................... 308/202; 308/218
[58] Field of Search ........... 308/202, 218, 217, 207 R, 308/207 A, 216, 201

[56] References Cited

U.S. PATENT DOCUMENTS

| 3,365,255 | 1/1968 | Altson | 308/217 |
| 3,537,766 | 11/1970 | Scheifele | 308/217 |
| 3,582,165 | 6/1971 | Koch | 308/217 |
| 3,963,285 | 6/1976 | Kellstrom | 308/202 |

Primary Examiner—Lenard A. Footland
Attorney, Agent, or Firm—Eugene E. Renz, Jr.

[57] ABSTRACT

The invention relates to a roller bearing having at least one row of rollers, in which the rollers are arranged at an angle to the bearing axis, an inner and an outer raceway for the rollers and a cast plastics cage for the rollers. The cage comprises two coaxial rings (1,2) and bars (3) extending between the rings, the rollers (4) being situated in pockets between the bars. In order to achieve a good positioning of the cage and a good guidance of the rollers when the cage is centered by contacting the rollers, the radial extension of the bars are greater than the radial width of the rings, whereby the bars have a portion (5) in connection to their middle part which portion extends radially inside or outside the pitch circle (6) of the rollers and contacts the rollers on a surface (7) so situated that a normal (8) through the contact of the roller surface with said surface (7) forms an angle (α) with a line (9) from the center of the bearing through the axis of the roller, the angle (α) being less than 60°. Further, the cage has a portion at each end of the roller with a roller contact surface (10) so situated that a plane (11) through the contact surface (10) and the roller axis forms an angle (β) with that plane (12) in which the roller is skewed when it is taking an oblique position in the cage pocket, the angle (β) being less than 15°.

3 Claims, 3 Drawing Figures

ROLLER BEARING WITH AN IMPROVED CAGE

The invention relates to a roller bearing of the kind defined in the introduction of the appended claim 1.

For a cage to give good roller guidance and little wear it is important that it is accurately centered and aligned in the bearing. Centering of the cage can be brought about by having the cage contact the outer ring, the inner ring or the rollers when it takes an eccentric position in the bearing, whereby the eccentricity is limited. The best roller guidance is obtained when the cage has guiding surfaces which contact the respective roller as close as possible to its end surfaces and so that the contact normal cage-roller lies in or close to the skew plane of the roller, i.e. the plane in which the roller is skewed when it takes an oblique position in the cage pocket so that the roller axis is not in the same plane as the bearing axis, and which comprises the roller axis. Roller cages of pressed sheet metal with such roller guiding surfaces are known, e.g. by SE patent publication No. 349,110. Since the surfaces extend mainly parallel to the radii from the centre of the bearing through the middle of the cage pockets limited by the surfaces, they are not suitable for centering the cage by contacting the rollers. Therefore, the bars of the cage are provided with recesses and protrusions, respectively, on which cage centering surfaces are arranged, which surfaces contact the rollers radially outside and inside of the pitch circle of the rollers, respectively. Bars of this shape can easily be provided in a cage of pressed sheet metal. If the cage instead is cast in a plastics material, which in certain respects is advantageous, it is difficult or impossible to make recesses or protrusions in the bars. Earlier known plastics cages for bearings of the kind herein referred to have bars with a comparatively small radial extension and are therefore unsuitable for being centered by contacting the rollers.

The purpose of the present invention is to obtain a roller bearing of the kind referred to in the introduction with a cage which gives a good roller guidance without the necessity of outer or inner ring centering. This is achieved by incorporating in the bearing the characterizing features which are defined in the accompanying Claim 1.

A bearing according to the invention comprises a cage which is made of cast plastics, which gives a low production cost and allows the use of long rollers and many or wide rollers in a bearing with given outer dimensions, which gives an ability of taking up heavy loads. The cage is designed so that it can be accurately centered by contacting the rollers.

The following is a detailed description of the invention with reference to the accompanying drawing, in which.

Figure 1:
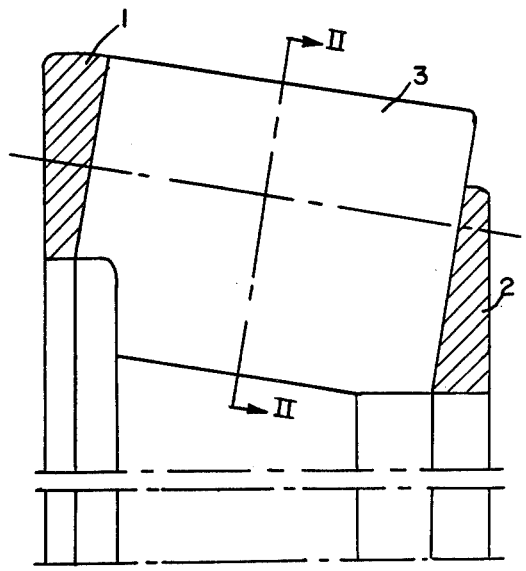
FIG. 1 shows an axial section through a portion of a cage for a bearing according to one embodiment of the invention.
Figure 3:
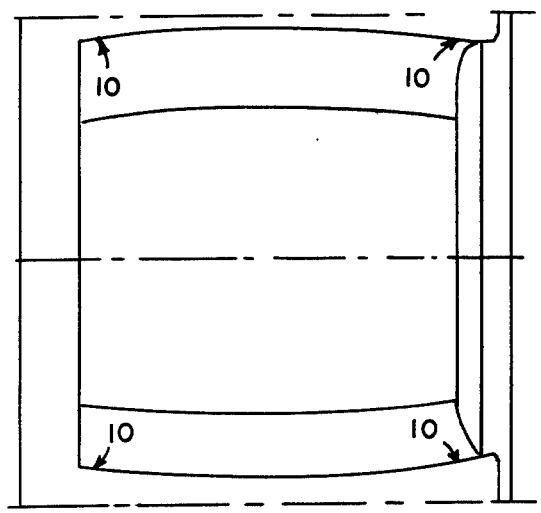
FIG. 3 shows a view of a cage pocket.
Figure 2:
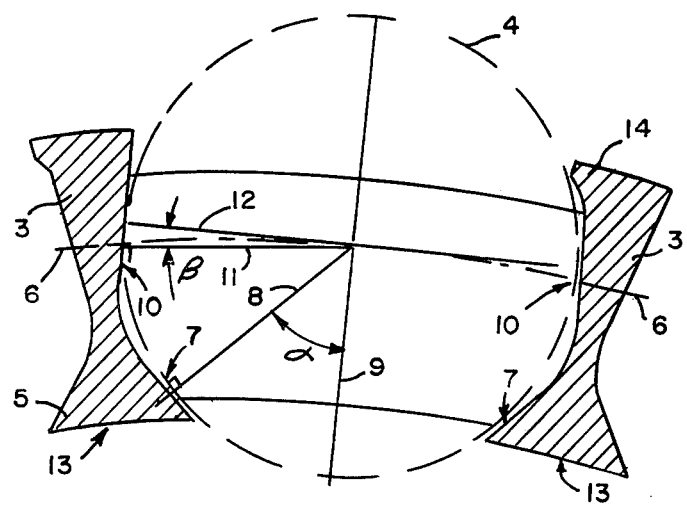
FIG. 2 shows a section according to II—II in FIG. 1.

FIGS. 1–3 show a portion of a cast plastics cage for a spherical roller bearing. The cage comprises two coaxial rings, 1, 2 of different sizes and a number of bars 3 which extend axially between the rings and are evenly distributed around the circumference of the cage. The rings and the bars are made in one piece and define a number of cage pockets in which the rollers are placed. The position of one roller is hinted by the dashed line 4. The rollers contact inner and outer raceways, which are omitted from the drawing and between which the rollers and the cage are situated, in the usual manner. The radial extension of the cage bars 3 is great because the outer diameter of the small ring 2 is greater than the bore diameter of the large ring 1 and because the cage bars extend radially inside and outside of the rings 1 and 2, respectively, in the vicinity of the rings. For reasons of geometry and casting technique the rings have a limited radial extension. By the fact that the rollers describe an angle to the bearing axis, the rings are given a wedge-shaped cross section. Too thin ring parts are difficult to cast with methods suitable for mass production, and too thick parts impairs the possibility of using long rollers. Therefore it is suitable to limit the inward extension of the ring 1 and the outward extension of the ring 2 to the position of the thinnest ring section possible.

FIG. 2 shows the shape of the cage bars in a section through the middle portion of the bars. The line 4 shows the outline of a roller arranged in a pocket between two cage bars 3. Each bar has a portion 5 which extend radially inside of the pitch circle 6 of the rollers and has a surface 7 intended for contacting the adjacent roller for centering the cage. The surface 7 is arranged so that a normal 8 through the contact of the roller with the surface forms an angle $\alpha$ with a line 9 from the bearing centre and through the axis of the roller, the angle being less than 60°. The smaller the angle the better the centering of the cage, but it is obviously impossible to obtain an angle of 0°, since a normally shaped roller in such case would not be able to contact the inner raceway. If the angle is less than 60° a fully satisfactory cage centering is achieved, and such an angle can be arranged without any problems.

For limiting the skewing of the roller in the cage pocket the cage bar has a portion in connection to each end of the roller with a surface 10 (FIGS. 2 and 3) which the roller contacts when it is skewed to the maximum extent. The surface is separated from the surface 7 and preferably so situated that a plane 11 through the contact of the roller surface with the surface and comprising the roller axis forms an angle $\beta$ with the skewing plane 12 of the roller of less than 15°. The best roller guidance is achieved if the angle is 0°, and such is the case if the surfaces 10 are parallel to the line 9. The closer to the ends the roller guiding surfaces are situated the better is the roller guiding ability of the cage, since thereby the lever arms for the forces which give a reactive moment against the skewing moment are the longest possible. In order to make the reactive force component perpendicular to the line 9 as great as possible, which gives maximum reactive moment against the skewing moments, the angle $\beta$ should be as small as possible. If $\beta$ is less than 15°, a good roller guidance is always obtained. If the surfaces 10 are parallel to the line 9, the angle $\beta$ is 0°, as mentioned above, and in that case the further advantage is obtained that the cage may take an eccentric position in the bearing without the play between roller and cage bar being changed appreciably.

By the fact that the cage bar is designed with the portion 5 it has a large surface 13 facing the bearing centre. This surface acts as a storage for lubricant grease, so that a large lubricant reserve is obtained. In a cage for a spherical roller bearing the width of the surface in the circumferential direction of the cage can be made greater than 0.2 times the roller diameter, and the length can be greater than 0.3 times the roller length without any special measures having to be taken.

In order to retain the rollers in the respective cage pockets at least one of the bars which surrounds each roller is provided with a protrusion 14 extending into the pocket. The protrusion is situated on the opposite side of the pitch circle of the rollers in relation to the position of the centering surface 7 on the cage bar. Thereby the roller can be snapped into the cage pocket past the elastically flexible protrusion 14 during mounting.

Other embodiments of the invention than the ones described above are possible within the scope of the claims. The cage bars 3 (FIGS. 1, 2) may be provided with portions arranged radially outside the pitch circle 6 which portions have surfaces for cage centering as an alternative to the portions 5, whereby protrusions corresponding to the protrusions 14 are preferably arranged at the insides of the cage bars, so that the rollers can be mounted by being pressed outwardly into the cage. The rollers 4 can have recesses in the end surfaces and the cage rings can have protrusions extending into said recesses in order to give a retaining effect. The surfaces 10 and thereby the plane 11 which together with the plane 12 defines the angle $\beta$ can be situated radially outside the plane 12.

We claim:

1. Roller bearing having at least one row of rollers, the rollers being arranged at an angle to the bearing axis, an inner and an outer raceway for the rollers and a cast plastics cage for the rollers, the cage comprising two coaxial rings (1, 2) and a number of bars (3) extending between the rings, the rollers (4) being situated in pockets between the bars, characterized by that the rings (1, 2) are of different size, the bore diameters of the larger one of the rings being smaller than the outer diameter of the smaller one of the rings, that the greatest radial extension of the cage bars (3) is greater than the radial width of the rings (1, 2), that each bar in the cage has a portion (5) in connection to the centre of the bar, which portion extends radially inside our outside the pitch circle (6) of the rollers and has a surface (7) for contacting the adjacent roller for centering of the cage, the surface being so arranged that, in a projection in a plane normal to the axis of the cage, a normal (8) through the roller surface contact against the surface forms an angle ($\alpha$) with a line (9) from the bearing centre and through the axis of the roller, the angle ($\alpha$) being less than 60°, and that the cage also has a portion in connection to each end of the rollers with a surface (10) for contacting and guiding of the respective roller, said surface being so arranged that a plane (11) through the roller surface contact with the surface and containing the roller axis forms an angle ($\beta$) with the skewing plane (12) of the roller, the angle ($\beta$) being less than 15°.

2. Roller bearing according to claim 1, in which the cage bars have a surface (13) facing the bearing centre, the width of the surface in the circumferential direction of the roller being greater than 0.2 times the roller diameter and the length of the surface in the axial direction of the bearing being greater than 0.3 times the roller length.

3. Roller bearing according to claim 1, in which at least one of the cage bars which surround each roller has a protrusion (14) extending in the circumferential direction of the cage and situated on that side of the pitch circle of the rollers which is opposite to the side on which the centering surface on the cage bar is situated.

* * * * *